US012085022B2

(12) United States Patent
Alecu et al.

(10) Patent No.: US 12,085,022 B2
(45) Date of Patent: Sep. 10, 2024

(54) AIRCRAFT FLUID SYSTEM PRESSURE VARIATION ATTENUATION

(71) Applicant: PRATT & WHITNEY CANADA CORP., Longueuil (CA)

(72) Inventors: Daniel Alecu, Brampton (CA); Ninad Joshi, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 700 days.

(21) Appl. No.: 16/835,813

(22) Filed: Mar. 31, 2020

(65) Prior Publication Data
US 2021/0102496 A1 Apr. 8, 2021

Related U.S. Application Data

(60) Provisional application No. 62/911,458, filed on Oct. 7, 2019.

(51) Int. Cl.
*F02C 7/24* (2006.01)
*B64F 5/60* (2017.01)

(52) U.S. Cl.
CPC . *F02C 7/24* (2013.01); *B64F 5/60* (2017.01)

(58) Field of Classification Search
CPC .. F02C 7/222; F02C 7/24; F02C 7/232; F02C 7/236; F05D 2260/962; G01L 19/0609; F01D 21/003; F01D 17/02; F01D 17/08; F01D 17/20; F01D 25/18; F01D 25/20; F23R 2900/00014; G01H 13/00; B64F 5/60; B64D 37/005
See application file for complete search history.

(56) References Cited

U.S. PATENT DOCUMENTS

| 1,377,970 | A | 5/1921 | Parent |
| 1,976,442 | A | 10/1934 | Finn |
| 2,400,161 | A | 5/1946 | Mockridge et al. |
| 2,426,833 | A | 9/1947 | Lloyd |
| 2,553,141 | A | 5/1951 | Maynard |
| 3,468,345 | A | 9/1969 | Tam et al. |
| 3,508,629 | A | 4/1970 | Haworth |

(Continued)

FOREIGN PATENT DOCUMENTS

| DE | 19516358 | 8/1996 |
| EP | 3610145 | 12/2021 |

(Continued)

*Primary Examiner* — Jason H Duger
(74) *Attorney, Agent, or Firm* — NORTON ROSE FULBRIGHT CANADA LLP (57) ABSTRACT

A fluid system of an aircraft engine includes a first and second fluid conduits. The first conduit fluid conduit fluidly connects to the aircraft engine. A pump fluidly connects to the first fluid conduit and moves therethrough a fluid imparting an excitation frequency to the fluid. The second fluid conduit fluidly connects to the first fluid conduit and to a pressure sensor. A weight is disposed in the second fluid conduit and movable between a first and second positions. A mass of the weight and a liquid capacitance of the second fluid conduit between the second position and a second end of the second fluid conduit define a resonance frequency that is less than the excitation frequency. Fluid pressure monitoring and pressure noise filter construction methods are also disclosed.

8 Claims, 9 Drawing Sheets

(56) References Cited

U.S. PATENT DOCUMENTS

| | | |
|---|---|---|
| 4,050,479 A | 9/1977 | Baumann |
| 4,412,582 A | 11/1983 | Mecozzi et al. |
| 4,420,016 A | 12/1983 | Nichols |
| 4,473,043 A | 9/1984 | Furukawa et al. |
| 4,594,877 A * | 6/1986 | Kyker ............... G01L 19/0609 73/1.65 |
| 4,920,746 A | 5/1990 | Gebelius |
| 6,514,047 B2 | 2/2003 | Burr et al. |
| 6,520,767 B1 | 2/2003 | Ahern et al. |
| 6,820,431 B2 | 11/2004 | McMannus et al. |
| 6,848,477 B2 * | 2/2005 | Treusch ............. F02M 37/0017 123/456 |
| 9,527,231 B2 | 12/2016 | Horst et al. |
| 9,709,450 B2 * | 7/2017 | Kurtz ............... G01L 19/0609 |
| 9,982,601 B2 | 5/2018 | Heims |
| 10,167,780 B2 | 1/2019 | Joshi et al. |
| 10,302,516 B2 | 5/2019 | DeRosa et al. |
| 2011/0147322 A1 | 6/2011 | Payne et al. |
| 2012/0060619 A1 * | 3/2012 | Gardner ............. G01L 19/0007 29/407.01 |
| 2012/0090531 A1 * | 4/2012 | Angus ............... G01L 19/0609 116/266 |
| 2015/0365072 A1 | 12/2015 | VanDeWeert et al. |
| 2016/0177836 A1 | 6/2016 | Wickstrom et al. |
| 2016/0333736 A1 | 11/2016 | Parnin |
| 2017/0159868 A1 | 6/2017 | Fisher |
| 2019/0162350 A1 | 5/2019 | Samarasinghe et al. |
| 2020/0040821 A1 | 2/2020 | Yeager et al. |
| 2020/0040889 A1 * | 2/2020 | Smith ............... G01N 11/00 |
| 2020/0348200 A1 * | 11/2020 | DeRosa ............. G01L 19/0636 |
| 2021/0116272 A1 * | 4/2021 | Carpenter ........... G01L 19/0007 |

FOREIGN PATENT DOCUMENTS

| | | |
|---|---|---|
| FR | 1454310 | 9/1966 |
| GB | 2066984 | 7/1981 |
| WO | 2019202616 | 10/2019 |

* cited by examiner

FIG-1

Target: $f_{plunger} = \dfrac{1}{4} \times f_{open\,line}$ $$\dfrac{1}{4\pi^2} \cdot \dfrac{\cancel{B}}{\rho_{metal}} \cdot \dfrac{A_p}{A_{line}} \cdot \dfrac{1}{\ell \cdot L} = \dfrac{1}{16} \cdot \dfrac{1}{16} \cdot \dfrac{\cancel{B}}{\rho_{liquid}} \cdot \dfrac{1}{L^2}$$

$$\dfrac{\rho_{liquid}}{\rho_{metal}} \cdot \dfrac{A_p}{A_{line}} \cdot \dfrac{L}{\ell} = \dfrac{\pi^2}{64} \approx \dfrac{1}{6.5}$$

$\dfrac{\rho_{liquid}}{\rho_{metal}} \rightarrow \dfrac{1}{9}$ $\dfrac{A_p}{A_{line}} \rightarrow \dfrac{1}{16}$ $\dfrac{L}{\ell} \rightarrow 20$

Operating a fluid system to generate a pressure of fluid in the system at an excitation frequency.

Conveying the pressure to a sensor via movement of a weight and corresponding compression of a fluid connecting the weight to the sensor, a mass of the weight and a volume of the fluid having been selected to define a resonance frequency of the weight and the fluid that is lower than the excitation frequency.

FIG. 8

AIRCRAFT FLUID SYSTEM PRESSURE VARIATION ATTENUATION

CROSS-REFERENCE

The present patent application claims priority to U.S. Patent Application No. 62/911,458, entitled "AIRCRAFT FLUID SYSTEM PRESSURE VARIATION ATTENUATION", filed on Oct. 7, 2019, which is incorporated herein by reference in its entirety.

TECHNICAL FIELD

The present disclosure relates to aircraft fluid system pressure variation attenuation systems and methods.

BACKGROUND

Prior art pressure sensing systems for fluid systems of aircraft engines exist and are suitable for their intended purposes. However, in some cases, for example where prior art pressure monitoring systems are implemented to monitor an oil system of an aircraft engine, aeration of oil in the oil system may adversely affect accuracy of the pressure measurements and/or life of the pressure sensors of the prior art systems. Therefore, improvements are desirable.

SUMMARY

In an aspect, there is provided a fluid system of an aircraft engine, comprising: a first fluid conduit fluidly connected to at least one part of the aircraft engine; a pump fluidly connected to the first fluid conduit, during at least part of operation of the fluid system, the pump moving a fluid via the first fluid conduit and imparting an excitation frequency to the fluid; a second fluid conduit at a first end thereof fluidly connected to the first fluid conduit and at a second end thereof fluidly connected to a pressure sensor; and a weight disposed in the second fluid conduit and movable between a first position and a second position within the second fluid conduit, the weight being closer to the first end of the second fluid conduit in the first position than in the second position, a mass of the weight and a liquid capacitance of the second fluid conduit between the second position and the second end of the second fluid conduit defining a resonance frequency of the second fluid conduit and being such that the resonance frequency is less than the excitation frequency.

In some embodiments, the weight blocks the second fluid conduit.

In some embodiments, the fluid system comprises a third fluid conduit at one end of the third fluid conduit fluidly connecting into the second fluid conduit at a first location and at another end of the third fluid conduit connecting into the first fluid conduit, the first location being open to the second fluid conduit when the weight is in the first position and being blocked by the weight when the weight is in the second position.

In some embodiments, the fluid system comprises a fourth fluid conduit at one end of the fourth fluid conduit fluidly connecting into the second fluid conduit at a second location and at another end of the fourth fluid conduit connecting into the second fluid conduit at a third location between the second position of the weight and the second end of the second conduit, the second location being closed to the second fluid conduit when the weight is in the first position and being blocked by the weight when the weight is in the first position.

In some embodiments, the weight is biased to a neutral position in between the first and second positions, and the weight blocks both the first and the second locations when in the neutral position.

In some embodiments, the weight is biased to the neutral position by at least one spring.

In some embodiments, the at least one spring is disposed at least in part in the second fluid conduit.

In some embodiments, the at least one spring is a plurality of springs including a first spring disposed on one side of the weight and another spring disposed on another side of the weight.

In some embodiments, the weight is a cylinder slidable within a corresponding cylindrical portion of the second fluid conduit.

In some embodiments, the weight includes a first seat and a ball receivable in the first seat, the second fluid conduit defines a second seat into which the ball is receivable, the ball is positioned between the second seat and the second end of the second fluid conduit, and the ball fluidly blocks the second fluid conduit when the ball is received in the second seat.

In some embodiments, the ball and the first seat are biased toward the second seat.

In some embodiments, the fluid system comprises a body threaded into a structure defining the second fluid conduit, the body defining an aperture therethrough aligned with the second fluid conduit, and the ball and the first and second seats are disposed at least in part within the aperture in the body.

In some embodiments, the threaded connection between the body and the structure is a direct threaded connection free from fluid seals.

In another aspect, there is provided a method of monitoring a pressure in a fluid system, the fluid system providing the pressure at an excitation frequency, comprising: operating the fluid system to generate the pressure; and conveying the pressure to a pressure sensor via movement of a weight and corresponding compression of a fluid connecting the weight to the pressure sensor, a mass of the weight and a volume of the fluid having been selected to define a resonance frequency of the weight and the fluid that is lower than the excitation frequency.

In some embodiments, the conveying the pressure via the fluid includes providing the fluid in a constrained volume between the weight and the pressure sensor.

In another aspect, there is provided a method of constructing a pressure noise filter for a fluid system of an aircraft engine, comprising: determining an excitation frequency of the fluid system; selecting a target resonance frequency of the pressure noise filter to be lower than the excitation frequency; selecting both: a) a mass of a weight of the pressure noise filter, the weight to be movable in response to pressure fluctuations in the fluid system, and b) dimensions of a fluid conduit of the pressure noise filter, the fluid conduit to fluidly connect the weight to a pressure sensor, to provide the target resonance frequency; and constructing the pressure noise filter having the weight having the mass and the fluid conduit having the dimensions.

In some embodiments, the step of selecting the dimensions includes selecting a volume of the fluid conduit.

In some embodiments, the method comprises selecting a target attenuation to be provided by the pressure noise filter and wherein the step of selecting the mass and the dimensions is executed to provide the target attenuation.

In some embodiments, the method comprises positioning the weight in an aperture defined in a structure such that the weight is movable between a first and second positions within the aperture while blocking the aperture, the structure being connectable to the aircraft engine so as to fluidly connect one end of the aperture to the fluid system of the aircraft engine, and fluidly connecting an end of the fluid conduit to the other end of the aperture.

In some embodiments, the method comprises connecting a pressure sensor to an opposite end of the fluid conduit.

DETAILED DESCRIPTION

The present technology is illustrated with respect to a fluid system of an aeronautical engine 10. In the embodiment shown in FIG. 1, the aeronautical engine 10 is a turboshaft gas turbine engine 10. In other embodiments, the aeronautical engine 10 is a turbofan engine. In yet other embodiments, the aeronautical engine 10 is a rotary engine. It is contemplated that the present technology can be applied to other types of engines and/or other fluid systems of aircraft engines.

For the purposes of the present description, the term "conduit" used with respect to a fluid describes an arrangement of one or more elements, such as one or more hoses, pipes, tubing, connectors and/or other elements, that together form the flow path or flow paths that the conduit is described to provide, and may be selected to provide for the functions described with respect to the conduit. For example, a given fuel conduit may be defined by any number and combination of fuel hoses hydraulically interconnected in parallel and/or series, by or with one or more fuel filters, switches, pumps, and the like, depending on the particular function(s) of the given fuel conduit and/or the particular embodiment of the engine that the given fuel conduit is used with, for example.

Figure 1:
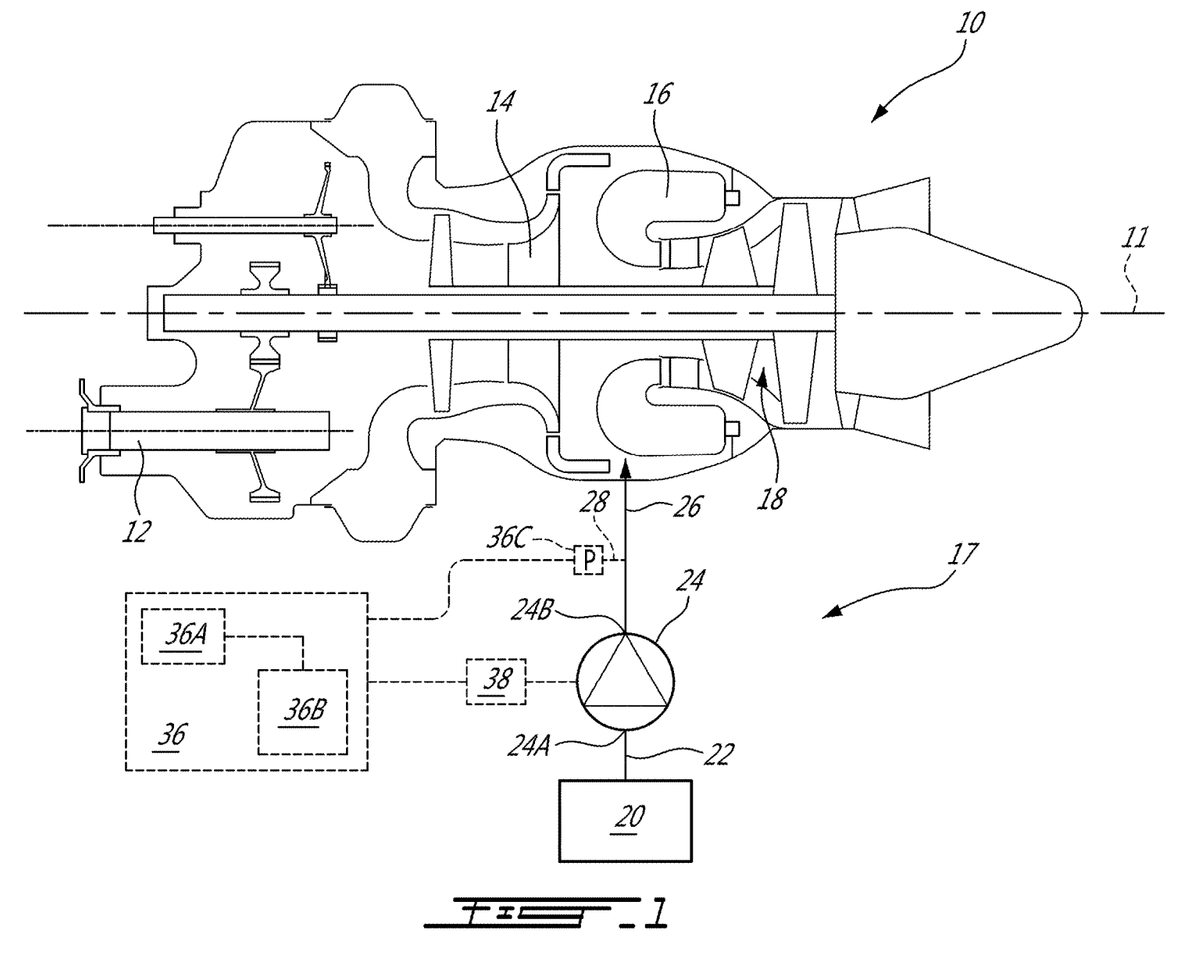
FIG. 1 is a schematic of an aircraft engine and a fluid system thereof.

Referring to FIG. 1, in the present non-limiting embodiment, the engine 10 comprises in serial flow communication a shaft 12 for driving a rotor, such as a rotor of a helicopter for example, a compressor section 14 for pressurizing ambient air, a combustion chamber 16 in which the compressed air is mixed with fuel and ignited for generating a stream of hot combustion gases, a fluid system 17 with respect to which the present pressure sensing technology may be implemented. In this embodiment the fluid system 17 is a fuel system of the engine 10 that delivers fuel to the combustion chamber 16. The engine 10 further includes a turbine section 18 for extracting energy from the combustion gases. Components of the engine 10 are rotatable about a longitudinal center axis 11 of the engine 10.

In this embodiment, fuel is supplied to the combustion chamber 16 via the fluid system 17 from a fuel source 20 such as a fuel tank of the aircraft with which the engine 10 is used. To this end, in the present embodiment, the fluid system 17 includes a fuel supply conduit 22 that is hydraulically connectable to the fuel source 20. A pump 24 is hydraulically connected to the fuel supply conduit 22 and to a fuel supply conduit 26. The pump 24 is driven by a suitable electric motor 38 in this embodiment, but other motors/actuators are contemplated.

The fuel supply conduit 26 hydraulically connects the pump 24 to the combustion chamber 16 via one or more fuel injectors, or fuel nozzles, that inject pressurized fuel into the combustion chamber 16. It is contemplated that the fluid system 17 could have a different arrangement of fuel conduits, so long as the functionality described in this document is achieved.

It is contemplated that in some embodiments, the fluid system 17 may include more than one fuel pump, with the pump 24 being one of the pumps. It is contemplated that one or more of the pumps could be upstream of the pump 24 and/or that one or more of the pumps could be downstream of the pump 24 and/or that one or more of the pumps could be hydraulically in parallel with the pump 24, etc, depending on each particular embodiment of the engine 10 and each particular type of aircraft with which the engine 10 is used.

The fluid system 17 may comprise additional elements, such as heat exchanger(s), fuel filter(s), additional pump(s), flow divider(s) and the like (not shown), that may be necessary for operation of the fluid system 17 depending on each particular application of the fluid system 17 and each particular embodiment of the engine 10 and each particular embodiment of the aircraft with which the engine 10 is used. Such additional fluid system elements may be conventional. Therefore, for clarity, such additional fluid system elements are not shown and are not described in detail.

In other embodiments, the fluid system 17 may be a different fluid system of the engine 10 supplying different fluid to different parts of the engine 10. For example, in some embodiments, the fluid system 17 may be a lubrication system, such as an oil system of the engine 10, supplying oil to one or more bearings, shaft(s) (e.g. a low pressure shaft or a high pressure shaft shown in FIG. 1), sealing cavities, and/or other parts of the engine 10 that may require lubrication. Accordingly, in such embodiments, the conduits associated with the lubrication system 17 may be accordingly lubricant/oil conduits fluidly connected to supply lubricant/oil to one or more parts of the engine 10 that may require lubrication. Hence, for example the conduits 22 and 26 may be oil conduits, and the fluid source 20 may be instead an oil reservoir instead of a fuel tank.

The fluid system 17, and for example the pump(s) 30, in some embodiments may be controlled to maintain a given fluid pressure at one or more points in the fluid system 17 and/or to shut down the fluid system 17 in case unacceptable fluid pressure conditions are detected during operation of the engine 10. To this end, a controller 36 may be operatively connected to the pump 24, and more particularly to its motor/actuator 38 in this embodiment. Still referring to FIG. 1, in the present embodiment, the controller 36 includes a processor 36A and a non-transient memory 36B communicatively coupled to the processor 36A.

The non-transient memory 36B has processor-executable instructions thereon which, when executed by the processor 36A, cause the controller 36 to execute its functions (e.g. controlling the system 17/pump 24, etc). The particular functions of the controller 36 may be selected to suit each particular embodiment of the fluid system 17. Such controls details may be conventional and are therefore not described in detail in this document. In some embodiments, the controller 36 may be a full-authority-digital-controller (FADEC) of the engine 10 and/or aircraft with which the engine 10 may be used. In some embodiments and applications, the fluid system 17 may not require an electronic or other controller.

As shown, in some cases the controller 36 may be operatively connected to a pressure sensor 36C that is fluidly connected to the conduit 26 and operable to sense fluid pressure in the conduit 26 at the point of connection. The pressure sensor 36C may be any suitable sensor selected to suit each particular embodiment of the fluid system 17 and its application, and may output any suitable pressure signal indicative of the pressure in the conduit 26. The signal may be analog or digital, and may be received by the controller 36 at any suitable intervals, or live for example as in the present embodiment.

Figure 2:
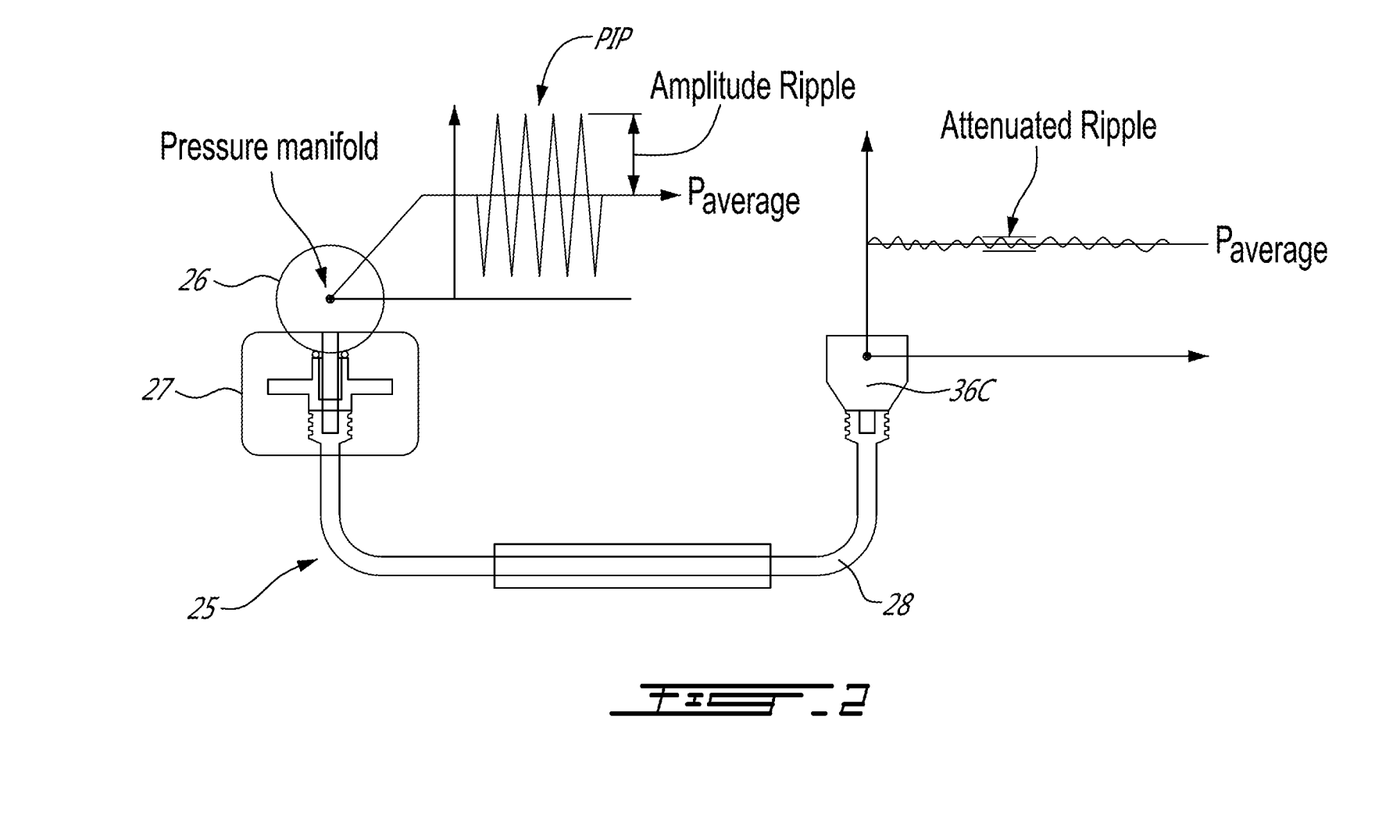
FIG. 2 is a schematic of a pressure noise filter fluidly connected to the fluid system of FIG. 1.

As shown schematically in FIG. 1 and in more detail in FIG. 2, the pressure sensor 36C that is fluidly connected to the conduit 26 via a pressure noise filter 25. As best shown in FIG. 2, in this embodiment, the pressure noise filter 25 includes a fluid conduit 28 (hereinafter referred to for convenience as "sensing conduit") at one end fluidly connected to the pressure sensor 36C. At its other end the sensing conduit 28 is fluidly connected to an open end of a movable weight assembly 27. In turn, at another open end thereof, the movable weight assembly 27 fluidly connects into a pressure manifold portion of the conduit 26, although other locations are also possible depending on each particular embodiment of the system 17 and the pressure to be measured.

Figure 3:
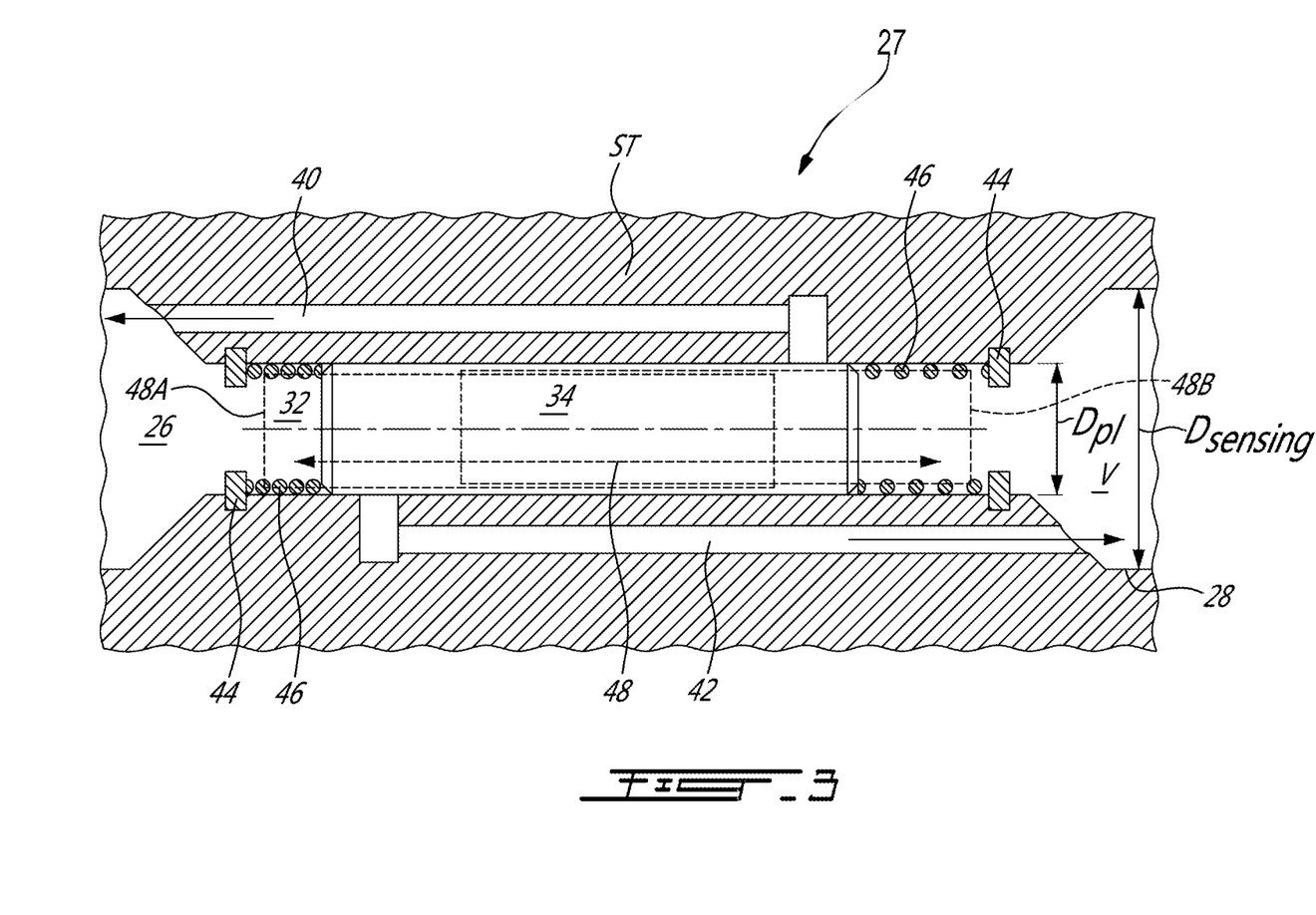
FIG. 3 is a close up schematic of a part of the pressure noise filter of FIG. 2.

The sensing conduit 28 may be a line and may be made of material(s), such as conventional materials, suitable to each particular embodiment of the system 17, the pressure to be measured, and the fluid to which the sensing conduit 28 is to be exposed. Referring to FIG. 3, the movable weight assembly 27 in this embodiment includes an aperture 32 and a movable weight 34 received movably, and more particularly slidably in this non-limiting embodiment, in the aperture 32. In this embodiment, the movable weight 34 is dimensioned to have a cross-section conforming to the shape of the portion of the aperture 32 along which the weight 34 is to move/slide.

The movable weight 34 thereby blocks the aperture 32, at the point of contact between the outer periphery of the movable weight 34 and corresponding part of the surface defining the aperture 32. In this embodiment, the movable weight 34 substantially fluidly blocks the aperture 32, but this may not be the case in other embodiments. It is contemplated that in other embodiments, the movable weight(s) 34 may block at least a majority of the aperture 32 and/or may be provided as multiple pieces each blocking at least a majority of the aperture 32 for example. Yet other ways of suitably blocking the aperture 32 with the weight(s) 34 may be used, for example depending on the particular application of the pressure noise filter 25.

In this embodiment, the movable weight 34 is integral (made of a single piece of material, such as steel or bronze for example), but may be made of more than one pieces in other embodiments which may or may not be connected to each other, so long as the functionality described in this document is provided. In this embodiment the aperture 32 is a cylinder and the movable weight 34 is a cylindrical plunger, but in other embodiments other corresponding shapes of the aperture 32 and the movable weight 34 may be used.

A first bypass conduit 40 at one end fluidly connects into the aperture 32 at a location proximate one end of the movable weight 34 and at its other end fluidly connnects into the conduit 26. A second bypass conduit 42 at one end fluidly connects into the aperture 32 at a location proximate the other end of the movable weight 34 and at its other end fluidly connnects into the sensing conduit 28. Two corresponding pairs of retainers 44 and centering springs 46 maintain the movable weight 34 aligned with the aperture and define a range of possible sliding movement 48 of the movable weight 34. The range 48 includes a first position 48A, shown schematically in FIG. 3, a second position 48B shown schematically in FIG. 3, and a neutral position between the first and second positions 48A and 48B. The movable weight 34 is shown in its neutral position in FIG. 3. The movable weight 34 is in the neutral position when pressure in the aperture 32 acting on one end of the movable weight 34 is equal to pressure in the aperture 32 acting on the other end of the movable weight 34.

In the present embodiment, the springs 46 are but one example of biasing members which may be used to bias the movable weight 34 to its the neutral position, and may be low stiffness springs. In cases of low stiffness springs, the springs may be selected to have a combined stiffness requiring at least some pressure differential, for example a pressure differential that is within a measurement error suitable for a given application, across the movable weight 34 to move the movable weight 34 away from its neutral position. Accordingly, the combined stiffness may be selected to be lower than the effective stiffness of the liquid in the sensing conduit 28. In other embodiments, a different number of springs and/or other biasing members may be used to provide the functionality described herein.

In the first position 48A, the location at which the bypass conduit 40 fluidly connects into the aperture 32 is open to the aperture 32 while the location at which the bypass conduit 42 fluidly connects into the aperture 32 is blocked by the movable weight 34. In the second position 48B, the location at which the bypass conduit 40 fluidly connects into the aperture 32 is blocked by the movable weight 34 while the location at which the bypass conduit 42 fluidly connects into the aperture 32 is open to the aperture 32. In its neutral position, the movable weight 34 blocks and in this embodiment thereby at least substantially fluidly seals the respective points at which the bypass conduits 40, 42 connect into the aperture 32.

For example, when the engine 10 and/or the system 17 is/are shut down, pressure in the conduit/manifold 26 may drop below the pressure in the sensing conduit 28, causing the pressure in the sensing conduit 28 to move the movable weight 34 toward the conduit/manifold 26. In some cases, the movable weight 34 will move sufficiently toward the conduit/manifold 26 to open the location at which the first bypass conduit 40 connects into the aperture 32, thereby releasing the pressure in the sensing conduit 28 into the conduit/manifold 26 until the pressure equalizes with the pressure in the conduit/manifold 26. At that point, the one of the springs 46 closest to the conduit/manifold 26 may move the movable weight 34 back toward and/or to its neutral position. In an aspect, this pressure equalizing action may allow the pressure sensor 36C to provide relatively more accurate pressure readings during and/or after engine 10 and/or system 17 shutdowns.

Conversely, during engine 10 and/or system 17 startups for example, pressure in the conduit/manifold 26 may rise relative to the pressure in the sensing conduit 28, thereby moving the movable weight 34 toward the sensing conduit 28. This may open the location at which the second bypass conduit 42 connects into the aperture 32, thereby releasing the pressure in the conduit/manifold 26 into the sensing conduit 28 until the pressure equalizes with the pressure in the sensing conduit 28. At that point, the one of the springs 46 closest to the sensing conduit 28 may move the movable weight 34 back toward and/or to its neutral position. In an aspect, this pressure equalizing action may allow the pressure sensor 36C to provide relatively more accurate pressure readings during and/or after engine 10 and/or system 17 startups. In another aspect, this may also allow the sensing conduit 28 to be filled with the fluid in the conduit/manifold 26 in cases where for example the sensing conduit 28 was replaced during maintenance with a sensing conduit 28 and not "pre-filled" or re-filled with the corresponding fluid. In another aspect, this may also allow the sensing conduit 28 to be filled with the fluid in the conduit/manifold 26 in cases where for example the sensing conduit 28 was aerated due to engine 10 operating conditions.

Figure 4:
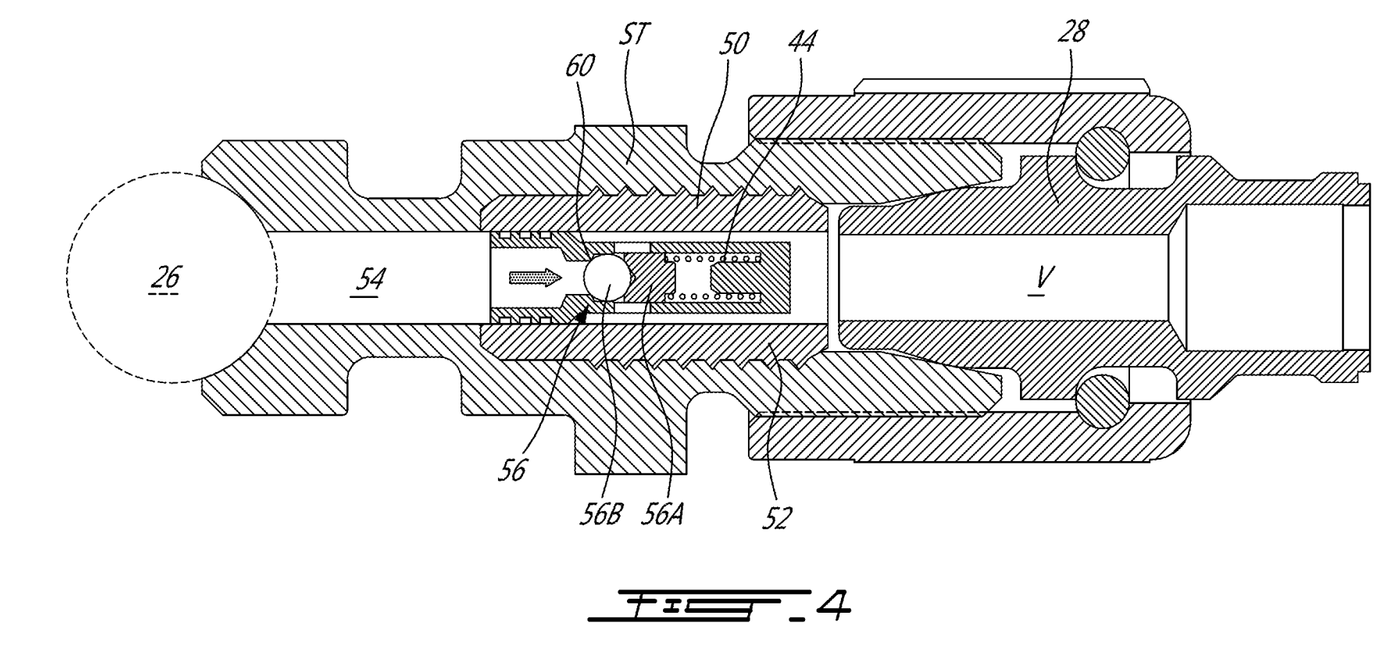
FIG. 4 is another embodiment of the part of the pressure noise filter of FIG. 2.

Referring to FIG. 4, a different embodiment of the movable weight assembly 27 is shown. The movable weight assembly 50 includes a body 52 with external thread that is threaded into a corresponding thread for example in a take-off line 54, such as a metal take-off line, fluidly connecting the movable weight assembly 50 to the conduit/manifold 26. The mated connection between the threads in this embodiment is direct/unsealed, meaning there are not sealants or pipe tape for example disposed between or adjacent the mated threads to prevent leakage through the interface/gaps between the mated threads. In an aspect, this trickle flow fluid connection which may provide for a fraction, such as 1/10 or for example in some embodiments 1/50 or less but more than zero, of the flow through the body 52 of the movable weight assembly 50 may replace the bypass conduits 40, 42 of the movable weight assembly 27 described above. That is, the trickle flow bypass connection may allow fluid to flow from the conduit/manifold 26 into the sensing conduit 28 when pressure in the former is greater than in the latter, and vice versa. In some embodiments, this may provide similar advantages as those described above with regard to the bypass conduits 40, 42.

Instead of the two centering/biasing springs 44 of the movable weight assembly 27, the movable weight assembly 50 may have a single centering/biasing spring 44 biasing a movable weight 56 (which may also be referred to as a "plunger") which includes a seat 56A and a ball 56B receivable in the seat 56A. The movable weight 56 may be receivable into a receiving seat 60, in a direction from the sensing conduit 28 toward the conduit/manifold 26. Yet other embodiments and shapes of the movable weight 56 may also be used. When in the seat 60, the ball 56B blocks flow from the sensing conduit 28 toward the conduit/manifold 26. When pressure in the conduit/manifold 26 exceeds the pressure in the sensing conduit 28, the pressure in the conduit/manifold 26 moves the ball 56B toward the sensing conduit 28, thereby opening a flow path through the body 52 to the sensing conduit 28 and hence equalizing these pressures and allowing the pressure sensor 36C to sense the pressure in the conduit/manifold 26.

Now referring to FIGS. 5 and 6, methods of configuring the pressure noise filter 25, 49 for each particular fluid system 17 and/or application thereof are described next.

According to an embodiment, variations of pressure and frequencies of the variations of pressure in the conduit/manifold 26 that may be expected during operation of the fluid system 17 are determined (collectively, "pressure input profile"). In some embodiments, a pressure input profile provided by the conduit/manifold 26 may be determined across an entire running range of the engine 10, or an entire operating envelope within which the engine 10 is designed to operate. An example pressure input profile is shown in FIG. 2 and labeled "PIP".

The pressure input profile may include a mean operating pressure in the conduit/manifold 26, which may be desired to be measured by the pressure sensor 36C and/or controlled by the fluid system 17 according to a control profile, such as a conventional control profile, selected to suit the particular embodiment and application of the fluid system 17. The pressure input profile may include a pressure ripple (e.g. rapid fluctuations in the mean operating pressure), which may occur at a given frequency (herein, "excitation frequency") and which may result for example from operation of the one or more pump(s) of the fluid system 17 in the operating range/envelope of the engine 10. The pressure ripple may be desired to be filtered out at least in part such that the output signal from the pressure sensor 36C indicates the mean operating pressure as accurately as possible. To provide a non-limiting example, in one particular embodiment of the engine 10, such as the one shown in FIG. 1, the pressure input profile may be determined to have a pressure ripple/excitation frequency of 300 hertz (Hz), and or a range of for example 250 to 350 hertz (this may differ depending on each particular system 17).

Once the above is determined, the method may proceed with defining a target resonant frequency of the pressure noise filter 25, whether it includes the movable weight assembly 27 or the movable weight assembly 50, or another embodiment of the movable weight assembly 27, 50. The target resonant frequency may be selected at a condition in which the sensing conduit 28 contains liquid (i.e. non-aerated fluid)—i.e. liquid from the fluid system 17. In at least some applications of the pressure noise filter 25, such as the fluid system 17, and for example in the cases where the fluid system 17 is a fuel system or lubrication system of the engine 10, the fluid in the sensing conduit 28 may be aerated at least during some operating conditions of the fluid system 18. The extent of aeration may vary for example from zero or virtually zero, in which case the fluid in the sensing conduit 28 may be a liquid, to relatively more aerated, in which case the fluid in the sensing conduit 28 may be a mixture of liquid and gas such as air or other gases that may be present in the fluid system 17. The sensing conduit 28 is therefore a liquid spring with respect to impulses/pressures applied to the sensing conduit 28 from the conduit/manifold 26, with the spring constant of the liquid spring changing as a function of the level of aeration of the fluid in the sensing conduit 28.

Figure 5:
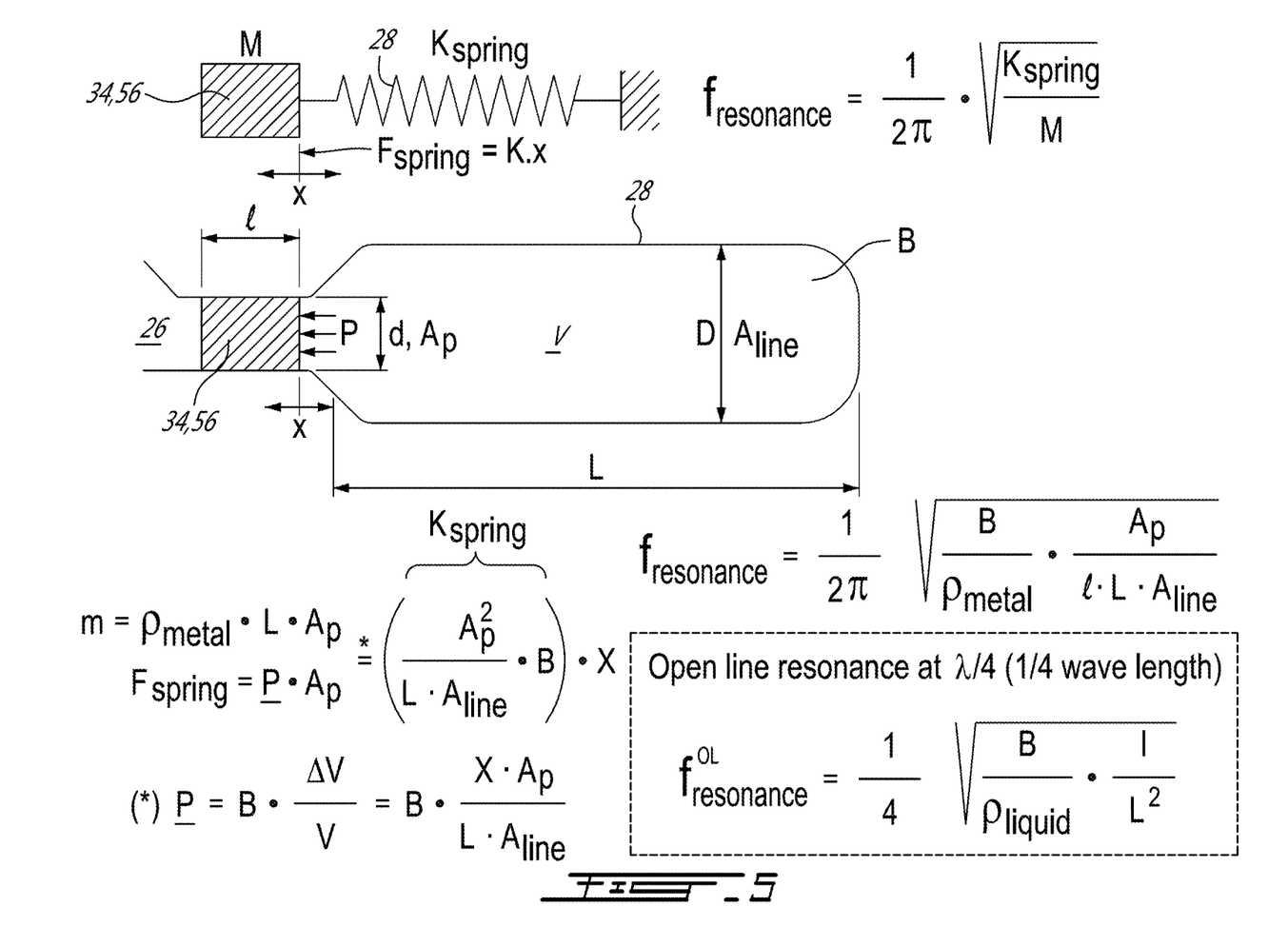
FIG. 5 shows schematics and considerations that may be used in configuring the pressure noise filter of FIG. 2.

Accordingly, the step of defining the target resonant frequency of the pressure noise filter 25 may include selecting a mass of the movable weight 34, 56 and a volume ("liquid capacitance" in FIG. 5) of the sensing conduit 28, with the latter defining the spring constant of the liquid spring. The mass (m) and the spring constant (k) of the liquid spring, and the resulting system of the sprung mass, are shown diagramattically in a top left corner of FIG. 5, with a resulting resonance frequency ($f_{resonance}$) as a function of the mass (m) and the spring constant (k) being represented as a mathematical formula to the right of the sprung mass diagram. Below the sprung mass diagram and the equation showing the resonance frequency ($f_{resonance}$) as a function of the mass (m) and the spring constant (k), are calculations/equations working out the resonance frequency ($f_{resonance}$) of the pressure noise filter 25 as a function of the dimensions and material density of the movable weight 34, 56, and the dimensions of the sensing conduit 28, with the additional parts of the equations and symbols in FIG. 5 being:

$\rho_{metal}$=density of the material (in this embodiment, but not necessarily in other embodiments, a metal) of the movable weight 34, 56;

$\rho_{liquid}$=density of the liquid in the sensing conduit 28;

l=a length of the movable weight 34, 56, taken along a center axis of the aperture 32 along which the movable weight 34, 56 slides;

$A_p$=an area of the end of the movable weight 34, 56 that faces toward the sensing conduit 28, in this embodiment a function of a diameter (d) of the movable weight 34, 56 because the movable weight 34, 56 is cylindrical, with the area function being different where and depending on other shapes/cross-sections of the movable weight 34, 56 which may be used;

P=pressure in the sensing conduit 28 acting on the end of the movable weight 34, 56 that faces toward the sensing conduit 28;

x=displacement of the movable weight 34, 56, and hence of the liquid spring;

D=diameter, such as an average diameter, of the sensing conduit 28;

L=length, such as an effective length, of the sensing conduit 28;

$A_{line}$=average cross-sectional area of the sensing conduit 28, in this embodiment a function of the diameter (D) and length (L) of the sensing conduit 28 because an entirety of the interior of the sensing conduit 28 that holds fluid in this embodiment is cylindrical;

B=bulk modulous of the fluid in the sensing conduit 28;

V=volume ("liquid capacitance") of the sensing conduit 28;

ΔV=a change in the volume ("liquid capacitance") of the sensing conduit 28 resulting from the displacement of the movable weight 34, 56; and for comparison $f^{OL}$ resonance=resonance frequency that the sensing conduit 28 would have if the movable weight assembly 27, 49 or the movable weight 34, 56 was not present, shown as an equation in a dashed box in a bottom right corner of FIG. 5.

Figure 6:
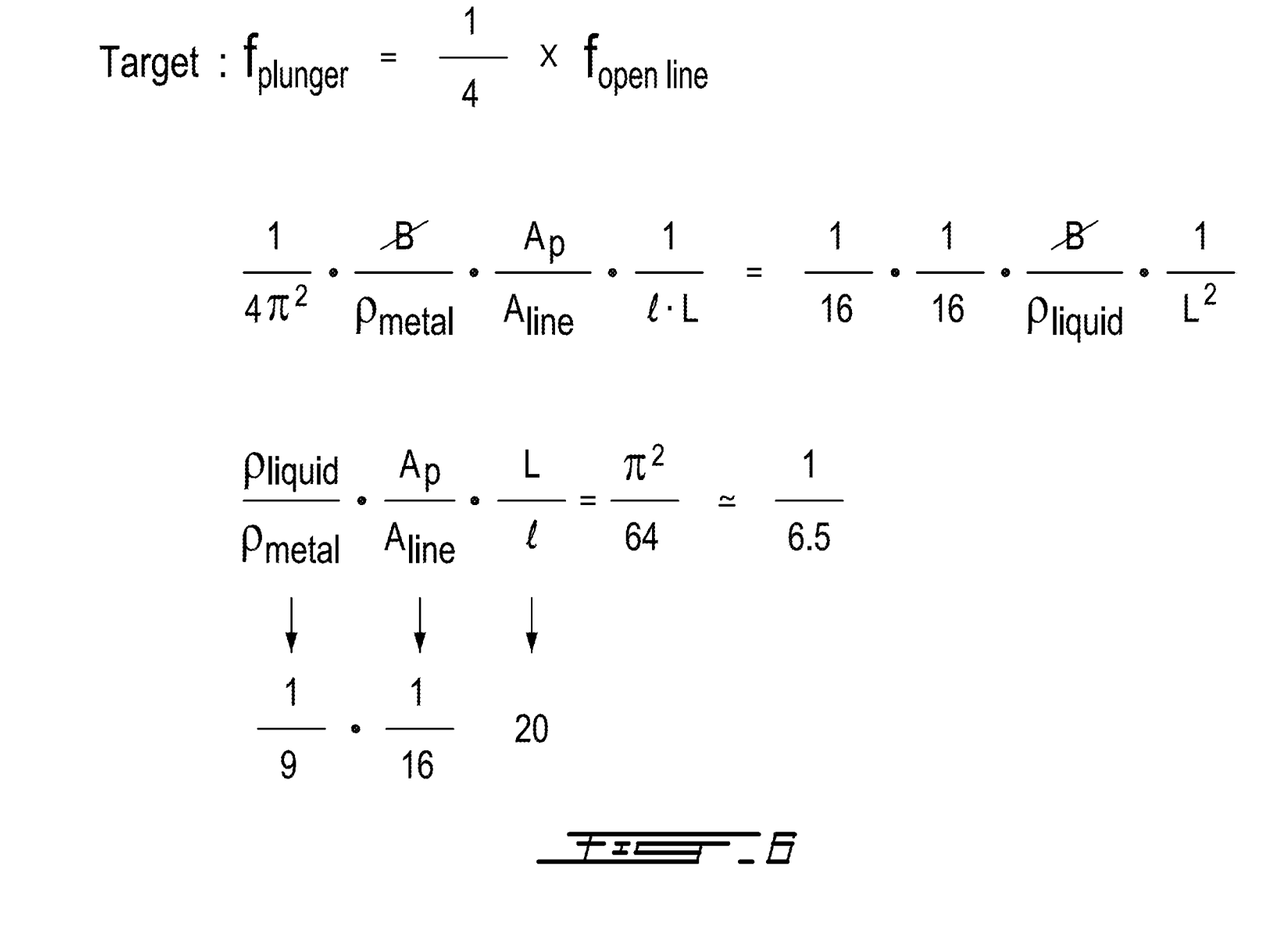
FIG. 6 shows considerations that may be used in configuring the pressure noise filter of FIG. 2.

In a similar manner to the principles shown in FIG. 5 and using the definitions set out above, and with an added variable "$f_{open\ line}$" being a resonant frequency of the sensing conduit 28 if the movable weight 34, 56 was not present, FIG. 6 shows principles of selecting design parameters, as as length (l) of the movable weight 34, 56 (referred to in FIG. 5 as "plunger"), to target a particular desired attenuation to be provided by the pressure noise filter 25. In FIG. 6, as a non-limiting example, calculations are shown targeting a 20 decibel (dB) target pressure noise attenuation. Other targets of pressure noise attenuation may be selected to suit each particular application of the pressure noise filter 25 for example. In an aspect, the functions/equations described herein above may represent/be used as methods of designing the pressure noise filter 25 for each particular application. The functions/equations, once learned from the present disclosure, may be modified using conventional mathematics to adapt the principles of the present technology to other combinations of possible shapes of the movable weight 34, 56 and the sensing conduit 28.

According to the principles above for example, the step of defining the target resonant frequency of the pressure noise filter 25 may include selecting a length/effective length of the movable weight 34, 56 and a volume of the sensing conduit 28 to provide the target resonant frequency. The target resonant frequency may be selected to be less than the pressure ripple/excitation frequency of the pressure input profile of the conduit/manifold 26. In some embodiments, and for example where the system 17 may be determined to have a possible range of excitation frequencies, the target resonant frequency may be selected to be less than a lower limit of the range of excitation frequencies.

In an aspect, it has been found that as opposed to "open tube" prior art pressure sensing arrangements in which aeration of lines connecting a pressure sensor to a location in which pressure is to be measured in which aeration of the lines may degrade sensing accuracy of the pressure sensor and/or contribute to a reduction of life of the pressure sensor by amplifying negative effects of the pressure ripple, aeration of the sensing conduit 28 of the pressure noise filter 25 may improve the noise filtering provided by the pressure noise filter 25 and/or reduce negative effects of the pressure ripple on the pressure sensor 36C. In an aspect, in the case of the pressure noise filter 25, increases in aeration in the liquid in the sensing conduit 28 have been found to reduce the resonant frequency of the pressure noise filter 25, thereby further distancing the resonant frequency from the excitation frequency/lower limit of an excitation frequency range of the system 17. In an aspect, this may help improve attenuation provided by the pressure noise filter 25. In another aspect, this may help reduce a likelihood of resonance in the pressure noise filter 25, and may thus help improve life of various components that may be associated with the pressure noise filter 25 (e.g. pressure sensor 36C).

Figure 7:
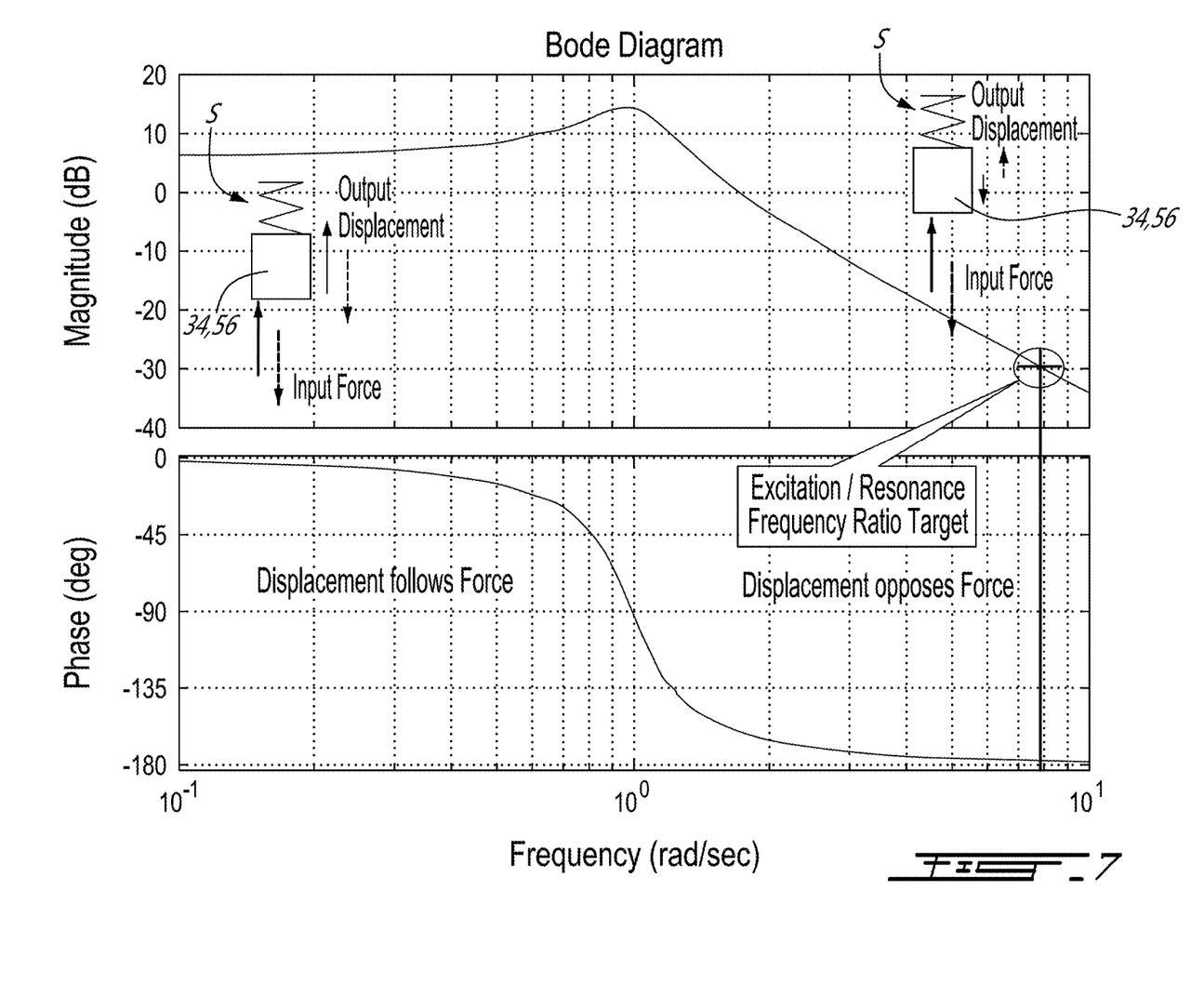
FIG. 7 shows operational characteristics of a configured pressure noise filter of FIG. 2.

At least some of the operational characteristics of the pressure noise filter 25 may be seen from FIG. 7, which schematically shows the movable weight 34, 56 and the liquid spring (S) provided by the sensing conduit 28, and a target ratio of the excitation frequency to the target resonance frequency. FIG. 7 shows the displacements of the movable weight 34, 56 that may result from the pressure ripple as corresponding lines in the upper one of the two diagrams shown, with the magnitude being shown in (dB). Accordingly, as a non-limiting example, at the example target ratio, for a 100 pounds-per-square inch (psi) pressure input to the movable weight 34, 56 from the conduit/manifold 26, an output of the sensing conduit 28 to the pressure sensor 36C may be 3 psi. This may help isolate the pressure sensor 36C from harsh operating conditions in the conduit/manifold 26 while allowing the pressure sensor 36C to sense the fluid pressure in the pressure sensor 36C.

In yet another aspect, it has been found that any aeration in the sensing conduit 28 tends to lower the resonant frequency of the pressure noise filter 25. Accordingly, since the pressure noise filter 25 is configured as described above to provide the target resonant frequency while the fluid in the sensing conduit 28 is a liquid (i.e. not aerated), and since the target resonant frequency is selected to be less than the excitation frequency of the pressure input profile of the conduit/manifold 26, aeration of the sensing conduit 28 that may occur during use would lower the resonant frequency of the pressure noise filter 25 even further away from the excitation frequency of the pressure input profile of the conduit/manifold 26, and hence from the actual frequencies of impulses/pressure variations that the conduit/manifold 26 may experience. Therefore, as opposed to the prior art, the pressure noise filter 25 may offer advantages in comparison with prior art sensing arrangements in applications in which aeration of fluid in the sensing conduit 28 is possible and cannot be reliably controlled/prevented.

In some embodiments of the present technology, the pressure noise filter 25 may be configured as described above to select the target excitation frequency thereof to be less than and a fraction of the excitation frequency. For example, in some embodiments, the target excitation frequency of the pressure noise filter 25 may be ½, ⅓, ¼, ⅕, . . . ¹⁄₁₀, and so on, of the excitation frequency. Therefore, selecting the target excitation frequency of the pressure noise filter 25 may be used to select a safety factor associated with the pressure noise filter 25 to suit each particular application of the pressure noise filter 25, which may help ensure that resonance in the sensing conduit 28 does not occur at any point in an entire operating envelope of the fluid system 17/engine 10 with which the pressure noise filter 25 may be used.

Figure 8:
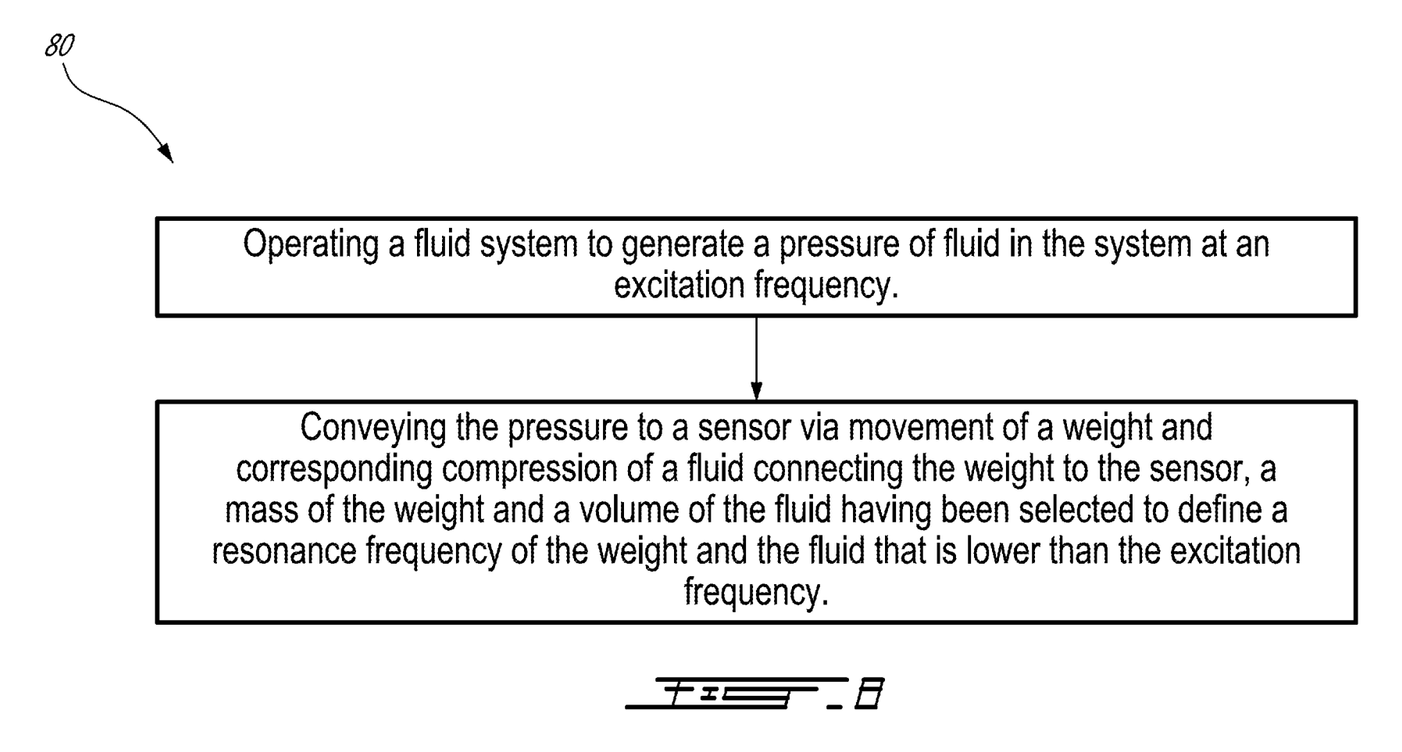
FIG. 8 shows a method of monitoring a pressure in a fluid system.
Figure 9:
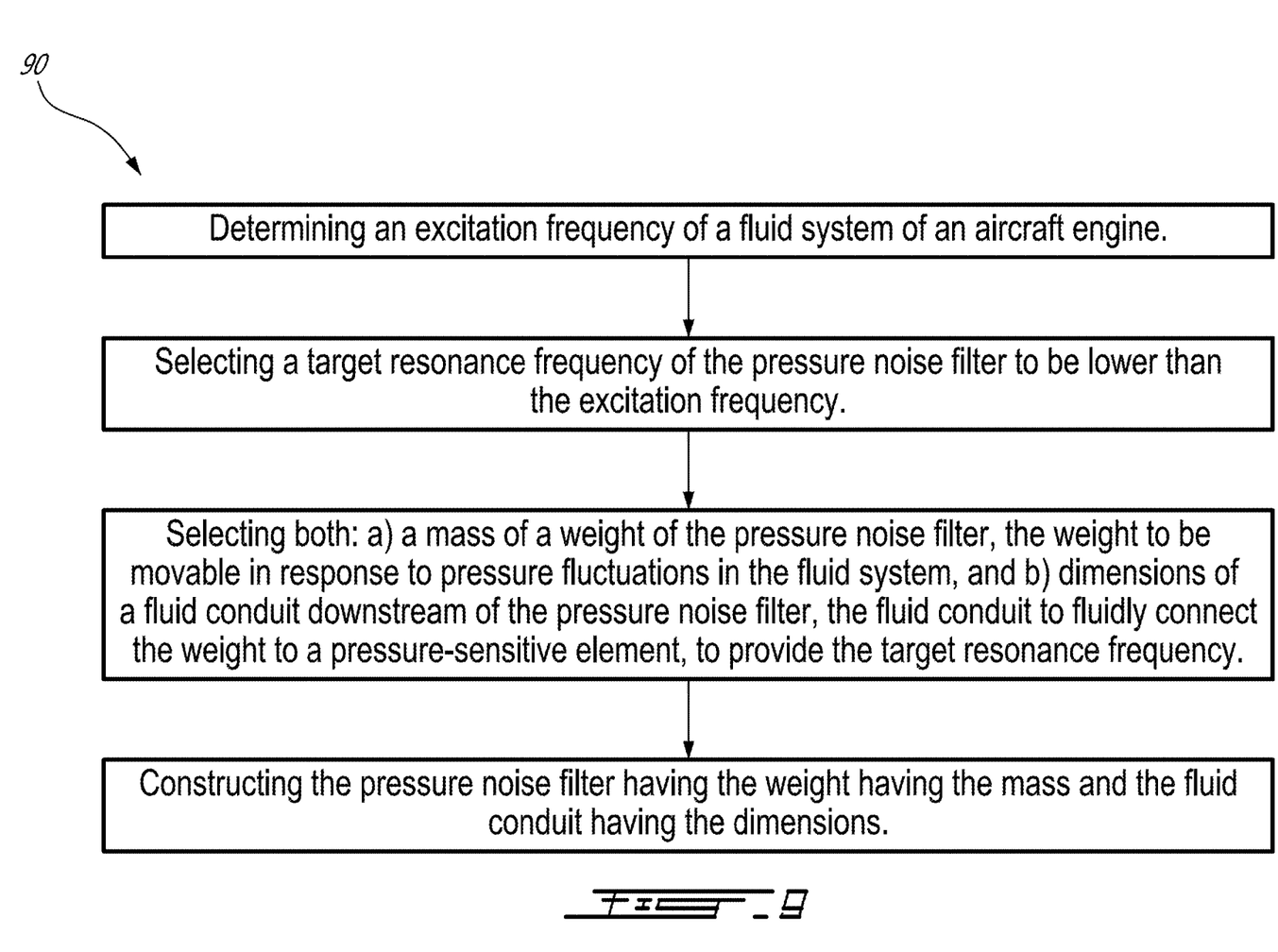
FIG. 9 shows a method of constructing a pressure noise filter for a fluid system of an aircraft engine.

With the description and structures described above in mind, the present technology further provides various methods, two non-limiting embodiments of which, methods 80 and 90, are illustrated in FIGS. 8 and 9, respectively.

As a non-limiting embodiment, the method 80 may be implemented using the embodiments of the pressure noise filter 25 and system 17 and engine 10 described above. As shown, in some embodiments the method 80 may include operating the fluid system to generate the pressure, and conveying the pressure to a pressure sensor (e.g. 36C) via movement of a weight and corresponding compression of a fluid connecting the weight to the pressure sensor, a mass of the weight and a volume of the fluid having been selected to define a resonance frequency of the weight and the fluid that is lower than the excitation frequency. In some embodiments, the step of conveying the pressure via the fluid may include providing the fluid in a constrained volume between the weight and the pressure sensor, such as by that of the sensing conduit 28.

The method 90 is a method of constructing a pressure noise filter (e.g. 25) for a fluid system (e.g. 17) of an aircraft engine (e.g. 10). The method 90 may include determining an excitation frequency of the fluid system, and selecting a target resonance frequency of the pressure noise filter to be lower than the excitation frequency. The method 90 may further include selecting both: a) a mass of a weight (e.g. 34/56) of the pressure noise filter 25, the weight 34/56 to be movable in response to pressure fluctuations in the fluid system 17, and b) dimensions of a fluid conduit (e.g. 28) downstream of the pressure noise filter 25, the fluid conduit 28 to fluidly connect the weight 34/56 to a pressure-sensitive element such as a sensor (e.g. pressure sensor 36C), to provide the target resonance frequency. In some embodiments, selecting the mass (m) of the weight 34/56 may include selecting a material appropriate to for example the dimensions and/or the intended application(s) of the pressure noise filter 25 for example.

In some embodiments, to lower the resulting resonance frequency of the pressure noise filter 25, the method 90 may include reducing a cross-sectional area of the weight 34/50, and in the case of cylindrical weight reducing its diameter. In some such embodiments, such a step may also include increasing the mass of the weight 34/50 while reducing the diameter. Different material selections for the weight 34/50 may also assist in such steps. The method 90 may further include constructing, for example using any suitable conventional materials and methods, the pressure noise filter 25 having the weight 34/56 having the mass and the fluid conduit 28 having the dimensions determined/selected above. The dimensions and other properties of the fluid conduit 28 may be selected to suit the particular fluid system 17/application.

In some embodiments, the step of selecting the dimensions includes selecting a volume (V) of the fluid conduit (e.g. 28). In some embodiments, the method 90 may include selecting a target attenuation to be provided by the pressure noise filter 25 and wherein the step of selecting the mass and the dimensions is executed to provide the target attenuation (e.g. in a range of 20 dB to 35 dB). In some embodiments, the method 90 may include positioning the weight 34 in an aperture (e.g. 32) defined in a structure (e.g. whichever structure (ST) may define the aperture 32 in the FIG. 3 embodiment, such as a part of a block of the engine 10, a separate part such as a metal part, a fluid line, and the like; and in the case of the FIG. 4 embodiment, for example the body 52) such that the weight 34 is movable between a first and second positions within the aperture while blocking the aperture 32, the structure being connectable to the aircraft engine 10 so as to fluidly connect one end of the aperture 32 to the fluid system 17 of the aircraft engine 10, and fluidly connecting an end of the fluid conduit 28 to the other end of the aperture 32. In some embodiments, the method 90 may further include connecting a pressure sensor (e.g. 36C) to an opposite end of the fluid conduit 28, as shown in FIG. 2 for example.

In yet another aspect, the present technology also provides a method of retrofitting prior art pressure sensing arrangements, by adding the movable weight assembly 27 to an existing pressure sensing conduit/line that may extend between a location where pressure is to be sensed and one or more pressure sensors. In some such cases, the conduit/line may need to be changed as described herein to provide for a target resonance frequency of the resulting pressure noise filter/system to be below the excitation frequency(ies) associated with the location where pressure is to be sensed.

The present technology has been found to sole or at least mitigate at least some of the issues that may be created in at least some prior art pressure sensing arrangements by the large variations in fluid properties, e.g. bulk modulus change due to aeration, which may entail large deviations from the original design tuning of the prior art systems, and by viscosity changes that may occur in some applications due to operating temperature changes (e.g. engine 10 cold start vs operating at steady state/warm conditions) which may result in large changes in flow restriction characteristics for example.

Any suitable materials, construction and manufacturing methods could be used to construct the systems described above, so long as the functionality described above is provided. Properties of the fluid and the excitation frequency(ies) of the system 17 may be determined using conventional methods. For example, in some embodiments, the fluid conduit 28 may be a fluid line. In the case of the system 17 being a fuel system, the fluid conduit 28 may be a fuel lineselected to withstand operating pressures of the fuel system. In the case of the system 17 being an oil system, the fluid conduit 28 may be an oil line selected to withstand operating pressures of the oil system. The above description is meant to be exemplary only, and one skilled in the art will recognize that changes may be made to the embodiments described without departing from the scope of the technology disclosed.

For example, it is contemplated that in some embodiments and/or applications, the pressure noise filter 25 may include multiple movable weight assemblies 27 and/or 50, which may be fluidly in series and/or in parallel with each other. As another example, more broadly, the pressure noise filter 25 may be a fluid conduit that includes therein at least one movable weight 34, 56, with the conduit being defined by one or more parts that are different from those described above.

As an example, one or more of the parts of such a conduit may be defined by a part of the engine 10, such as in/by a part of an engine block and/or a combination of bore(s) in a metal body and/or fluid lines to give only a few examples. Accordingly, in some such embodiments, the pressure noise filter 25 may not have a body 52 for example. As yet another example, while the various embodiments of the pressure noise filter 25 described above are purely/solely mechanical, i.e. limited to mechanical parts, it is contemplated that one or more types of electronics may be added to provide further filtering. As yet another example, while a particular fluid connection arrangement of the conduit 28 to a structure (ST) is shown, any other connection suitable to each particular application of the pressure noise filter 25 may be used. As yet another example, while the systems and methods described above have been illustrated with respect to a pressure sensor, in other embodiments and/or applications they may be used with respect to a different type of sensor, and/or a different number of sensors, and/or with respect to a different type of one or more elements. Hence, in some embodiments, the pressure sensor 36C may be for example a temperature sensor, or other sensor(s) and/or other pressure-sensitive element(s) that may benefit from the functionality of the pressure filtering functionality provided by the present technology (e.g. at least some types of valve(s) and/or other element(s) which may be negatively affected by unfiltered pressure variations in at least some operating mode(s) and/or application(s)). As yet another example, while in the illustrated embodiments the pressure-sensitive element 36C is part of the aircraft engine 10, in other embodiments it does not need to be. Still other modifications which fall within the scope of the present technology will be apparent to those skilled in the art, in light of a review of this disclosure.

The invention claimed is:

1. A fluid system of an aircraft engine, comprising:
    a first fluid conduit fluidly connected to at least one part of the aircraft engine;
    a pump fluidly connected to the first fluid conduit, during at least part of operation of the fluid system, the pump moving a fluid via the first fluid conduit and imparting an excitation frequency to the fluid;
    a second fluid conduit at a first end thereof fluidly connected to the first fluid conduit and at a second end thereof fluidly connected to a sensor; and
    a plunger disposed in the second fluid conduit and slidably movable between a first position and a second position within the second fluid conduit,
        the plunger being closer to the first end of the second fluid conduit in the first position than in the second position,
        wherein a liquid capacitance of the second fluid conduit is defined by a volume within the second fluid conduit between the plunger and the second end of the second fluid conduit,
        a mass of the plunger and the liquid capacitance of the second fluid conduit defining a resonance frequency of the second fluid conduit, the mass of the plunger and the liquid capacitance selected to maintain the resonance frequency less than the excitation frequency; and
    a third fluid conduit at one end of the third fluid conduit fluidly connecting into the second fluid conduit at a first location and at another end of the third fluid conduit connecting into the first fluid conduit, the first location being open to the second fluid conduit when the plunger is in the first position and being blocked by the plunger when the plunger is in the second position.

2. The fluid system of claim 1, wherein the plunger blocks the second fluid conduit.

3. The fluid system of claim 1, comprising a fourth fluid conduit at one end of the fourth fluid conduit fluidly connecting into the second fluid conduit at a second location and at another end of the fourth fluid conduit connecting into the second fluid conduit at a third location between the second position of the plunger and the second end of the second conduit, the second location being closed to the second fluid conduit when the plunger is in the first position and being blocked by the plunger when the plunger is in the first position.

4. The fluid system of claim 3, wherein the plunger is biased to a neutral position in between the first and second positions, and the plunger blocks both the first and the second locations when in the neutral position.

5. The fluid system of claim 4, wherein the plunger is biased to the neutral position by at least one spring.

6. The fluid system of claim 5, wherein the at least one spring is disposed at least in part in the second fluid conduit.

7. The fluid system of claim 5, wherein the at least one spring is a plurality of springs including a first spring disposed on one side of the plunger and another spring disposed on another side of the plunger.

8. The fluid system of claim 1, wherein the plunger is a solid cylinder.

* * * * *